July 1, 1941.  H. N. ARMBRUST  2,247,568
INJECTION NOZZLE
Filed May 13, 1938
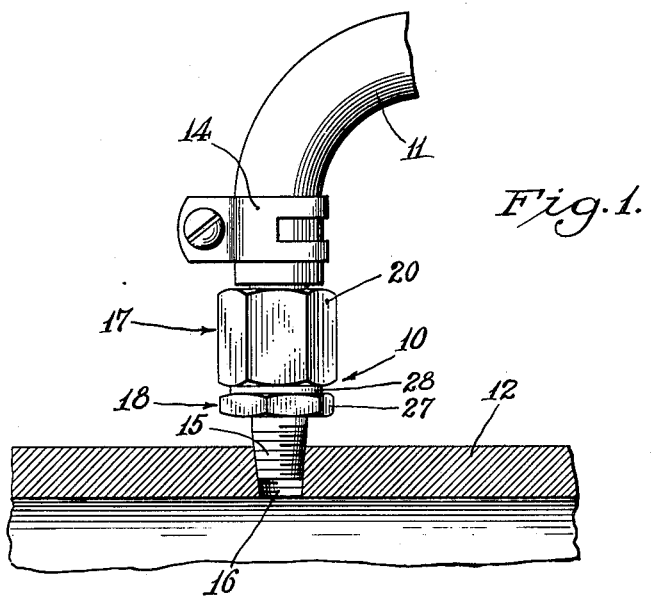
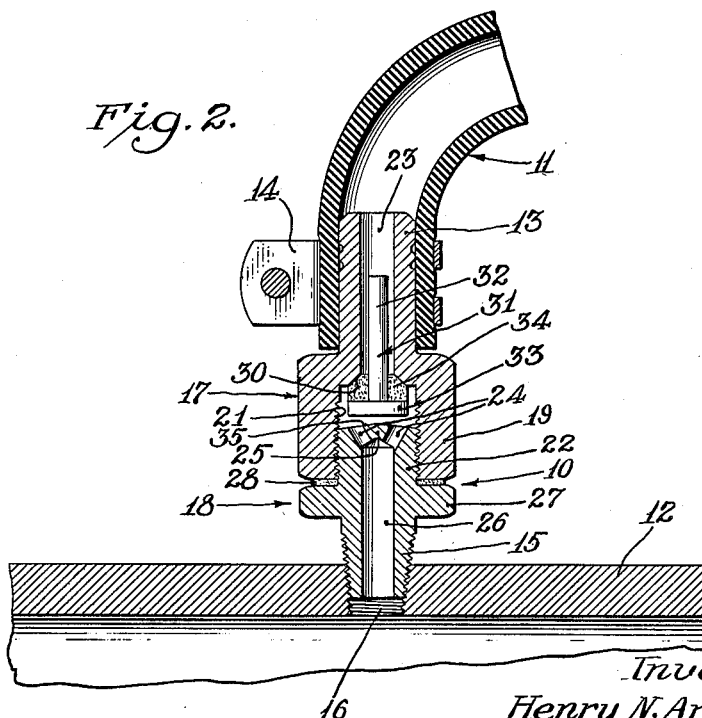
Inventor
Henry N. Armbrust
BY
Fred Bing
Attorney.

Patented July 1, 1941

2,247,568

UNITED STATES PATENT OFFICE 2,247,568

INJECTION NOZZLE

Henry N. Armbrust, Providence, R. I., assignor to Proportioneers, Inc., Providence, R. I., a corporation of Rhode Island Application May 13, 1938, Serial No. 207,799

1 Claim. (Cl. 251—127)

The invention relates generally to injection nozzles through which fluids may be injected into pipe lines and the like, and more particularly it relates to valved nozzles of this character.

In the use of nozzles of this character for the injection of corrosive liquids, such as hypo-chlorite, into pipe lines it has been customary to employ nozzles formed from hard rubber throughout, and to provide such nozzles with turn cock valves. Such prior valves have been found to be objectionable because of the brittle, breakable character of the various parts thereof, and this objection has been particularly noticeable by reason of the use of rubber hose connections to the nozzle, these connections often acting to trip the workmen in such a manner as to cause breakage of the injection nozzle. In addition, such prior nozzles, if adjusted tightly enough to prevent leakage about the turn cock or valve member, were subject to breakage by the force required to turn the valve on and off.

An important object, therefore, of the present invention is to provide a new and improved injection nozzle of the valved type which is simple in construction and rugged in use.

Another object is to provide a valved injection nozzle of this character which is efficiently operable with a wide range of line pressures, from a relatively low line pressure to a relatively high line pressure.

A further object is to provide a new and improved valved injection nozzle wherein the valve structure is rugged in character and constructed for convenient and inexpensive maintenance.

Other objects and advantages will become apparent from the following description, taken in connection with the accompanying drawing in which:

Fig. 1 is a side elevational view of an injection nozzle embodying the features of the invention.

Fig. 2 is an enlarged longitudinal sectional view of the nozzle of Fig. 1.

For purposes of disclosure, I have illustrated in the drawing and will hereinafter describe in detail the preferred embodiment of the invention, with the understanding that I do not intend to limit my invention to the particular construction and arrangement shown, it being contemplated that various changes may be made by those skilled in the art without departing from the spirit and scope of the appended claim.

In the form chosen for disclosure herein the invention is embodied in a valved injection nozzle 10 which serves as the connecting fitting between a discharge line in the form of a hose 11 from a pump (not shown) and a pipe line 12 which carries a major fluid flowing therein under pressure. Such a hose 11, when used for conveying a corrosive liquid such as hypo-chlorite, is preferably of a material such as rubber which must occasionally be replaced, and the injection nozzle 10 is therefore formed with an elongated connecting sleeve 13 on which the end of the hose 11 may be secured by a conventional hose clamp 14. At its other end, preferably coaxial with the sleeve 13, the injection nozzle 10 has a tapered, threaded attaching nipple 15 which is screwed into a conventionally tapped opening 16 in the main fluid line 12.

The nozzle 10, as herein shown, is formed from two separably related members 17 and 18, the member 17 having the attaching sleeve 13 formed as an integral part thereof, and the attaching nipple 15 being formed as an integral part of the member 18. Since the present invention has as one of its objects the provision of an injection nozzle which will resist breakage, the members 17 and 18 are formed from metal; and to permit use of the nozzle with corrosive liquids, the metal employed is of a corrosion resistant type such as Monel metal, Hastelloy or stainless steel.

In the form illustrated the member 17 constitutes the main valve body of the device and has an enlarged housing portion 19 squared as at 20 on its outer surfaces (Fig. 1) for the application of a wrench thereto, and having an enlarged threaded counterbore 21 concentric with the sleeve 13 so as to define the sides and one end of a valve chamber. The other end of the valve chamber 21 is defined by a screw threaded, plug-like extension 22 of the nipple 15, said extension 22 being screwed into the threaded valve chamber 21. Fluid from the hose 11 enters the valve chamber 21 through the bore 23 of the sleeve 13, and leaves the valve chamber 21 through a plurality of holes 24 in an end wall 25 of the extension 22, the holes 24 being angularly related as shown in Fig. 2 and opening into an axial discharge or injection bore 26 which extends from the wall 25 through the extension 22 and the nipple 15.

Between the threaded portions of the nipple 15 and the extension 22 the member 18 has a projecting flange 27 which limits or determines the depth to which the extension 22 may be screwed into the valve chamber, the end of the housing portion 19 and the adjacent side face of the flange 27 having opposed parallel faces between which a sealing washer 28 may be clamped. As shown in Fig. 1, the flange 27 has its outer edges squared to provide for the application of a wrench thereto.

The sleeve 13 has its bore 23 opening coaxially into the counterbore or valve chamber 21 and at its inner face has an annular beveled face or border defining a valve seat 30.

To cooperate with the valve seat 30 in preventing reversal of flow, that is, flow of the main fluid from the main line 12, valve means is provided in the present nozzle. This valve means is preferably of the check-valve type and is, in accordance with the present invention, so constructed as to be capable of use with corrosive fluids and with pipe lines having the main fluid under a relatively high pressure. The present valve means is, however, so constructed as to insure proper valve closure even with relatively low line pressures, thus rendering the present nozzle capable of use in a wide variety of field conditions.

With these ends in view the valve means herein illustrated comprises a rigid member 31 having an elongated guide stem 32 and a head 33, with a sealing ring or collar 34 for engaging the valve seat 30. The guide stem 32 is relatively long and narrow and extends loosely into the inlet bore 23, the cross sectional relationship of the stem 30 and the bore 23 being such as to provide sufficient effective area in the bore 23 to allow passage of the liquid to the valve chamber 21. The head 33 is of such a size as to be opposed to the valve seat 30 throughout substantially its entire area, and the sealing collar 34 is backed up or supported by the head 33, and is pressed thereby against the valve seat 30. Thus the valve member will withstand high line pressures, and yet will seal effectively at low line pressures.

It will be noted that the open position of the valve member 31 is determined by abutment of the head 33 thereof with the wall 25, and to avoid sticking of the valve member in its open position, the wall 25 has its surface formed with a slight cone, as indicated at 35, thereby to provide a point centrally thereof for contact by the head 33 of the valve member. The length and width of the guide stem 32 are so proportioned with respect to the sloping face 35 and the diameter of the bore 23 that such a point contact is assured in all possible positions of the valve member.

With this construction the pointed surface 35 acts as an abutment to maintain the head 33 of the valve in spaced relation to the outlet holes 24, thereby assuring free flow of the pumped liquid through the injection nozzle and into the pipe line 12.

Having in mind the use of the present nozzle with corrosive fluids, the valve member 31 is formed from a resistant material such as hard rubber, or if exceptionally high line pressures are to be encountered, it may be made of the same materials as the members 17 and 18. The sealing washer or collar 34 is for the same reasons made from a soft resilient material which will resist the action of corrosive fluids, the use of soft rubber or Neoprene being considered preferable. The sealing collar 34 has a snug fit on the stem 32 and hence is held in place by frictional contact. With this construction replacement of the sealing collar may be accomplished with relative ease.

From the foregoing description it will be evident that the present invention provides an efficient and durable injection nozzle for liquid proportioning or blending apparatus which materially simplifies the operation of such apparatus by reason of its automatic closure in the event of hose or pump breakage. Moreover the present injection nozzle has its valve constructed to operate efficiently with either high or low line pressure so as to increase the usefulness of the device.

In addition, the valve member is so constructed as to simplify its renewal or upkeep.

I claim as my invention:

A valved injection nozzle of the character described adapted for use with corrosive fluids, said injection nozzle comprising a pair of members formed from corrosion resistant metal, one of said members having a recess formed in one end to provide a valve chamber, and the other of said members having a plug-like element formed thereon threaded into said threaded recess of said one member to form a closed valve chamber, said one member having an elongated nipple projecting from its other end with an elongated inlet passage therethrough opening into the inner end of said recess and being formed with a valve seat bordering said passage on the inner end of said recess, valve means in said chamber comprising a rigid member formed from hard corrosion resistant material to provide a guiding stem freely slidable in said inlet passage and a rigid head integral with said guide stem and maintained in opposed relation to said seat by said guide stem, said rigid member having a replaceable collar of soft corrosion resistant resilient material carried on said stem and backed by said rigid head of the valve member, said plug having an outlet passage formed therein and being shaped to provide a point contact abutment lying in the path of said head to limit its movement away from said seat and maintain said head in spaced relation to said outlet passage, an externally screw threaded attachment nipple formed in an integral axial relation to said plug and through which said outlet passage extends, an integral outwardly extending flange located between said plug and its attachment nipple and formed integral therewith to oppose the border surface about the outer end of said recess and limit the projection of the plug into said recess, and a soft rubber washer clamped between said flange and said border surface, the outer peripheral surfaces of said flange and said recessed member being formed with wrench-engaging surfaces.

HENRY N. ARMBRUST.